US011816695B2

(12) United States Patent
Gaynor et al.

(10) Patent No.: US 11,816,695 B2
(45) Date of Patent: Nov. 14, 2023

(54) DIRECTED INFORMATION PERFORMANCE ENHANCEMENT

(71) Applicant: Target Brands, Inc., Minneapolis, MN (US)

(72) Inventors: James Gaynor, Lawrence, PA (US); Christopher Horn, Pittsburgh, PA (US); Patrick Pisciuneri, Pittsburgh, PA (US); Jonah P. White, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 80 days.

(21) Appl. No.: 17/027,430

(22) Filed: Sep. 21, 2020

(65) Prior Publication Data
US 2022/0092636 A1   Mar. 24, 2022

(51) Int. Cl.
*G06Q 30/00* (2023.01)
*G06Q 30/0242* (2023.01)
*G06F 16/957* (2019.01)
*G06N 20/00* (2019.01)
*G06Q 30/0251* (2023.01)
(Continued)

(52) U.S. Cl.
CPC ..... *G06Q 30/0244* (2013.01); *G06F 16/9577* (2019.01); *G06N 20/00* (2019.01); *G06Q 30/0201* (2013.01); *G06Q 30/0246* (2013.01); *G06Q 30/0263* (2013.01); *G06Q 30/0264* (2013.01); *G06Q 30/0277* (2013.01)

(58) Field of Classification Search
CPC ........... G06Q 30/0244; G06Q 30/0201; G06Q 30/0246; G06Q 30/0263; G06Q 30/0264; G06Q 30/0277; G06N 20/00; G06F 16/9577
See application file for complete search history.

(56) References Cited

U.S. PATENT DOCUMENTS

| | | | |
|---|---|---|---|
| 8,645,205 B2 | 2/2014 | Nag et al. | |
| 2003/0131106 A1* | 7/2003 | Kasriel | G06F 16/957 707/E17.119 |

(Continued)

OTHER PUBLICATIONS

Prassad; Targeted_advertising_in_the_online_video_space; IEEE; pp. 129-133; 2012.*

(Continued)

*Primary Examiner* — Radu Andrei
(74) *Attorney, Agent, or Firm* — Merchant & Gould P.C.

(57) ABSTRACT

In some aspects, a system for enhancing performance of directed information delivery is provided. In one example, an advertising recommendation server receives an advertisement request including an advertisement for display on at least one of a plurality of webpages and a requested performance of the advertisement. The server extracts context data from the advertisement, and provides the extracted context data to a data model useable to generate predictions of performance of the advertisement when displayed on each of a plurality of webpages, trained based on performance data associated with previous displays of one or more previous advertisements on one or more of the plurality of webpages and context data from the one or more previous advertisements. A webpage is identified that meets expected performance, and a recommendation is provided to a decision platform.

16 Claims, 6 Drawing Sheets

(51) Int. Cl.
*G06Q 30/0201* (2023.01)
*G06Q 30/0241* (2023.01)

(56) References Cited

U.S. PATENT DOCUMENTS

| | | | |
|---|---|---|---|
| 2011/0179176 A1* | 7/2011 | Ravichandran | H04L 67/02 |
| | | | 709/226 |
| 2011/0231399 A1* | 9/2011 | Zhang | G06F 16/355 |
| | | | 707/E17.089 |
| 2012/0253948 A1* | 10/2012 | O'Bryan | G06Q 30/0273 |
| | | | 705/14.71 |
| 2013/0080264 A1* | 3/2013 | Umeda | G06Q 30/02 |
| | | | 705/14.69 |
| 2013/0346182 A1 | 12/2013 | Cheng et al. | |
| 2014/0068011 A1 | 3/2014 | Zhang et al. | |
| 2014/0130076 A1 | 5/2014 | Moore et al. | |
| 2018/0373723 A1* | 12/2018 | Levi | G06N 7/01 |
| 2020/0342500 A1* | 10/2020 | Kulkarni | G06Q 30/0277 |
| 2021/0081467 A1* | 3/2021 | Chawla | G06F 40/30 |

OTHER PUBLICATIONS

Zhang; Sequential Click Prediction; IEEE; 7 pages; 2014.*
Jian Xu et al.,Smart Pacing for Effective Online Ad Campaign Optimization, Yahoo Inc., Jun. 18, 2015, 10 Pages, Sunnyvale, California USA.

* cited by examiner

500

```
┌─────────────────────────┐
│ Receive ad for display  │
│           502           │
└─────────────────────────┘
            ↓
┌─────────────────────────┐
│ Receive instructions on │
│ expected ad performance │
│           504           │
└─────────────────────────┘
            ↓
┌─────────────────────────┐
│   Extract context and   │
│ content data associated │
│      with the ad        │
│           506           │
└─────────────────────────┘
            ↓
┌─────────────────────────┐
│ Retrieve historical ad  │
│ performance data and    │
│ webpage similarity data │
│           508           │
└─────────────────────────┘
            ↓
┌─────────────────────────┐
│ Predict performance of  │
│ ad when displayed on    │
│ each of the plurality of│
│   content provider      │
│       webpages          │
│           510           │
└─────────────────────────┘
            ↓
┌─────────────────────────┐
│ Order the plurality of  │
│    content provider     │
│   webpages based on     │
│ predicted performance of│
│           ad            │
│           512           │
└─────────────────────────┘
            ↓
┌─────────────────────────┐
│  Identify a subset of   │
│   content provider      │
│  webpages from the      │
│  ordered plurality of   │
│ webpages that will meet │
│ the advertiser's expected│
│   performance of ad     │
│           514           │
└─────────────────────────┘
            ↓
┌─────────────────────────┐
│ Recommend that the ad   │
│ be displayed on one or  │
│ more of the identified  │
│      webpage(s)         │
│           516           │
└─────────────────────────┘
```

FIG. 5

DIRECTED INFORMATION PERFORMANCE ENHANCEMENT

BACKGROUND

Directed information, such as online advertisements, are an important source of revenue for companies. Typically, a determination of effectiveness of such directed information may be measured using number of impressions, click through rates, etc. In the context of advertisements, such performance is generally higher when the content is displayed to targeted customers. For example, when advertisements for a product or service are displayed to a relevant audience (a group of individuals would actually be interested in the product or service), the chances of an individual clicking on the advertisement are increased.

Existing advertisement servers prioritize advertisements received from a variety of advertisers to meet particular goals in terms of number of views, time of views, type of advertisement placements, etc. However, these servers often do so across advertisers, in an attempt to ensure that all advertiser goals are met.

In some instances, such as in the case of an online retailer, an advertiser may seek to place an advertisement on a webpage of its own retail website. This may be the case for, for example, cross-selling of additional or complementary products that may be of interest to a particular user. However, such advertisers may not have a significant ability to determine which advertisements are placed on which webpages of its own website if those advertisements are served by a third party advertising server, since the decision process executed by the advertising server may not be exposed to the advertiser.

SUMMARY

In general, methods of enhancing performance in delivery of directed information, such as advertising data (e.g., "advertisements", or "ads") presented on a product webpage, are provided. In example aspects, existing advertisement placements are analyzed to determine characteristics of advertisements and the performance of the placement of those advertisements. This extracted data may be used to extrapolate to performance of the same or similar ads on the same or different web pages. Accordingly, a new ad may be received and its performance predicted using such previous performance. One or more webpages may be selected for placement of the new ad based at least in part on such extrapolation and prediction.

In a first aspect, a computer implemented method to optimize performance of an advertisement is provided. The method includes receiving the advertisement for display on at least one of a plurality of webpages, and receiving instructions on expected performance associated with the advertisement. The method also includes extracting context data associated with the advertisement and retrieving performance data associated with previous displays of one or more previous advertisements on one or more of the plurality of webpages. The method further includes using the extracted context data associated with the advertisement and retrieved performance data, predicting the performance of the advertisement when displayed on each of the plurality of webpages. The method includes organizing the plurality of webpages in an order based on the predicted performance of the advertisement on each of the plurality of webpages, and using the organized plurality of webpages, identifying a webpage among the plurality of webpages that meets the expected performance. The method includes recommending that the advertisement be displayed on the webpage based on a set of specifications.

In a second aspect, a system to optimize performance of an advertisement includes a processor and a non-transitory computer-readable medium storing data instructions which, when executed by the processor, cause the processor to: receive the advertisement for display on at least one of a plurality of webpages; receive instructions on expected performance associated with the advertisement; extract context data associated with the advertisement; retrieve performance data associated with previous displays of one or more previous advertisements on one or more of the plurality of webpages; using the extracted context data associated with the advertisement and retrieved performance data, predict the performance of the advertisement when displayed on each of the plurality of webpages; organize the plurality of webpages in an order based on the predicted performance of the advertisement when displayed on each of the plurality of webpages; using the organized plurality of webpages, identify a webpage among the plurality of webpages that meets the expected performance; and recommend that the advertisement be displayed on the webpage based on a set of specifications.

In a third aspect, an advertisement recommendation server includes a processor and a non-transitory computer-readable medium. The computer-readable medium stores data instructions which, when executed by the processor, cause the processor to: receive an advertisement request including an advertisement for display on at least one of a plurality of webpages and a requested performance of the advertisement; extract context data from the advertisement; provide the extracted context data to a random forest data model useable to generate predictions of performance of the advertisement when displayed on each of a plurality of webpages, the random forest data model being trained based on performance data associated with previous displays of one or more previous advertisements on one or more of the plurality of webpages and context data from the one or more previous advertisements; identify a webpage among the plurality of webpages that meets the expected performance based on the generated predictions of performance of the advertisement; and transmit a recommendation that the advertisement be displayed on the webpage to a decision platform.

BRIEF DESCRIPTION OF THE FIGURES

FIG. 5 illustrates an example flow diagram of the method for recommending an optimal placement for an ad.

DETAILED DESCRIPTION

Figure 1:
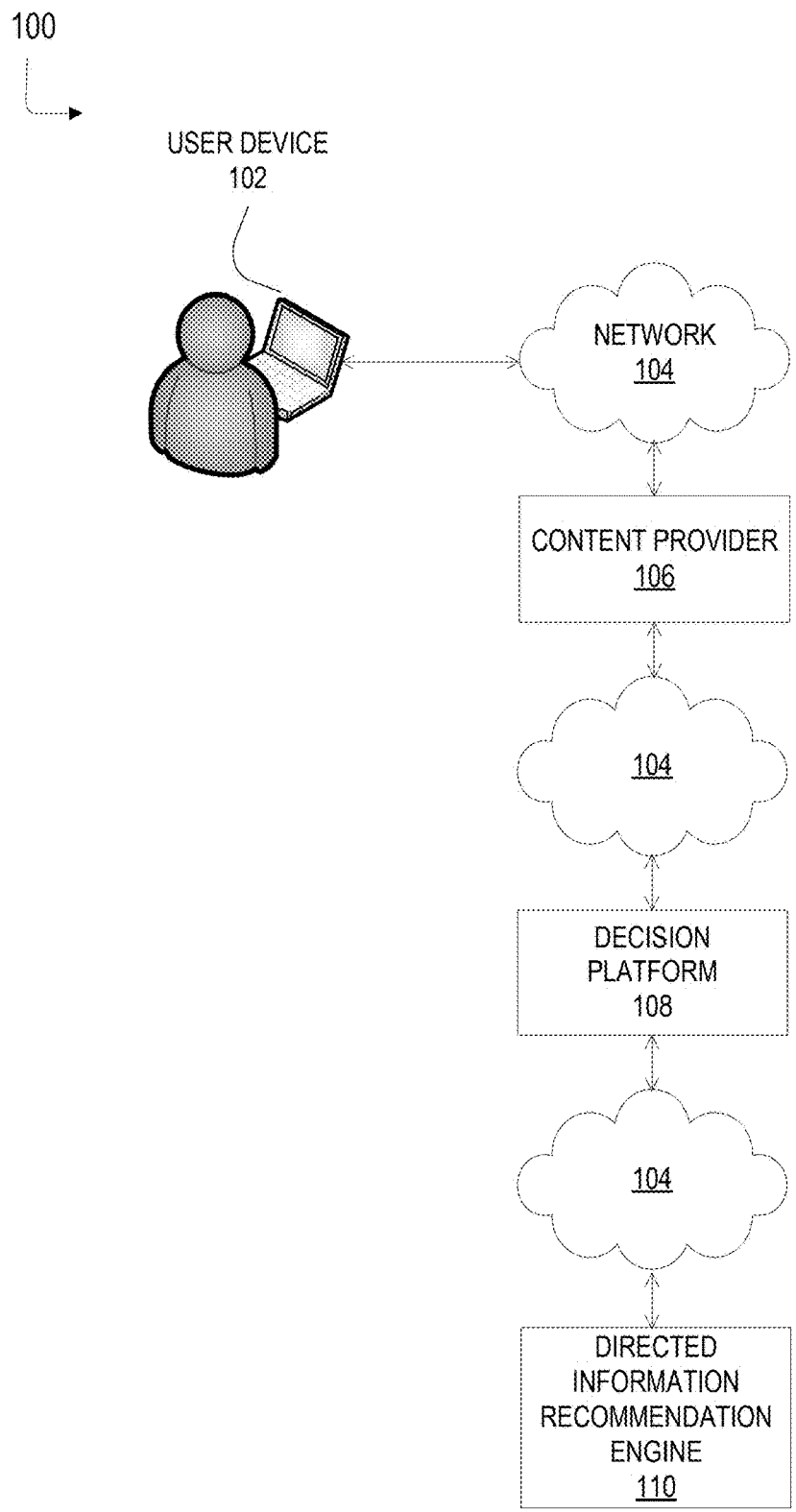
FIG. 1 illustrates an example directed information recommendation system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In the general context of the present disclosure, advertisers may at times implement advertisement recommendation systems that provide advertisement recommendations to an advertisement server. The advertisement recommendation systems may define one or more advertising programs to be implemented using the advertisement server. Such advertisement recommendation systems may provide advertisement recommendations based on a variety of criteria, e.g., previously-viewed items for a particular user, particular promotional items, etc. to an advertisement server, which independently determines one or more such recommendation programs from which to generate an advertising impression by inclusion of a reference to a particular advertisement in a definition of the webpage.

In general, the subject matter of this disclosure relates to improvements in a real-time advertisement recommendation engine that leverages customer data to improve relevancy and to optimize advertisement delivery. Previously available advertisement recommendation tools and advertisement campaign delivery methodologies suffer from high variability, and do not always fulfil impression goals or click through rate goals. The disclosed advertisement recommendation engine can be used by retail stores selling a variety of products through an online website to improve a rate at which performance metrics are met. The disclosed advertisement recommendation engine uses customer data, prior advertisement performance and target webpage data in order to predict performance of a particular advertisement on each webpage within the retailer website. Further, the disclosed advertisement recommendation engine can make a recommendation of which one or more webpages would result in the best performance for the particular advertisement.

Typically the website of an online retailer selling a large number of products may be organized to include a hierarchy of webpages. For example, an online retailer website may include: (i) product listing webpages—webpages that list a plurality of products, often grouped together because of some similarity between the products, such as results from a search for a product, products with the same category ID, etc. and (ii) product details webpages—webpages that list a single product and including greater details associated with the product.

In some examples, the advertisement recommendation engine can make recommendations regarding which webpage a particular advertisement should be displayed on based on contextualization. Advertisement contextualization includes displaying advertisements that are related to the product or products that are on the webpage itself.

Advertisement contextualization can be effective in delivering targeted advertisements to customers because of the assumption that a customer browsing a particular webpage is likely looking for the product or products displayed on the webpage. Therefore, it is likely that the customer may also have a need for other products related to the displayed product(s) or different brands of the same product. For example, if a guest is currently viewing a product listing page for diapers, then theoretically, the guest is likely interested in purchasing diapers or other baby products. Therefore, displaying an ad for diapers, wipes, diaper creams, etc. on the webpage may result in the best performance for diaper related advertisements.

In some examples, the disclosed advertisement recommendation engine is configured to extract historical data related to performance of all advertisements displayed on all webpages of the retailer website. The extracted historical data is then used to extrapolate any gaps in performance data using a similarity matrix. The extracted and extrapolated data regarding the webpages and historical advertisement performance is used to train a data model that can then use the information to make predictions of how a novel advertisement, e.g., an advertisement that has not been previously displayed on the website, would perform on a particular webpage. When a new or novel advertisement is received by the system, the content and context of the advertisement is identified. The data model is then used to predict how the newly received advertisement would perform in all of the retailer's webpages. Each of the retailer's webpages is ranked according to how well the advertisement is predicted to perform when displayed on the particular webpages. In some examples, the webpages may be ordered in descending order, starting with the webpage that the advertisement would have the best performance on to the webpage that the advertisement would have the worst performance on. The advertisement recommendation engine may use one or more factors in addition to the webpage rankings to select a webpage that would best serve the advertisement and the customer's needs. After delivery of the advertisement for display, the performance of the advertisement can be continuously monitored and based on the performance, the placement of the advertisement can be changed to a different webpage or based on a different set of specifications.

FIG. 1 illustrates an example directed information recommendation system 100. The system 100 includes a user device 102 connected over a network 104 to a content provider 106. The content provider 106 can be generally any kind of provider of content, including audio content, video content, text content, image content, and combinations thereof. The content can include directed information, as well as the primary content that is a focus of the content provider (e.g., an online shopping content provider provides shopping content, a video game smartphone app provides a video content, etc.).

Selecting, placing and providing the directed information by the content provider 106 can be facilitated by a decision platform 108. The decision platform 108 can be connected to a directed information recommendation engine 110. The decision platform 108 can communicate with the directed information recommendation engine 110 to facilitate selecting, placing, and providing of the directed information (e.g., displaying or otherwise presenting the directed information at the user device 102) in association with the content provided by the content provider 106. In some examples, the decision platform 108 may be connected to one or more different types of directed information recommendation engines 110 that each include a different method of optimizing and recommending directed information.

The user device 102 can be any device suitable for receiving content and directed information, e.g., for receiving content for use by the device or user from the content provider 106, and optionally providing such content to a user of the device 102. For instance, the user device 102 can be a smartphone, a laptop computer a desktop computer a smart home device, among other devices. An example of a computing environment that may be suitable for implementing one or more aspects of the user device 102 is shown and described in relation to FIG. 6.

The network 104 is an electronic communication medium that facilitates communication between multiple different devices. The network 104 can include links between multiple computing devices and can include a variety of different kinds of hardware (e.g., routers, hubs, servers, etc.) or software to connect the devices. The network 104 can vary in scope and configuration. In some examples, the network 104 is a local area network, a wide area network (e.g. the Internet), or an intranet, among others.

The content provider 106, the decision platform 108 and the directed information recommendation engine 110 can all be implemented as part of a same or different computing environment. In many embodiments, the computing environment may be a server or a virtual machine running on a server, but other implementations may also be used. An example of an architecture of a computing environment for the decision platform 110. In another example of a computing environment is provided in FIG. 6.

In the disclosed embodiment, the directed information includes advertisements, the directed information recommendation engine 110 is an advertisement recommendation engine 110 and the decision platform 108 is an advertisement manager tool 108. Other configurations are also possible. The disclosed directed information recommendation engine 108 or advertisement recommendation engine 108 (as referred to hereinafter) uses historical advertisement performance data to predict the performance of potential advertisements. Other methods of optimizing and recommending directed information are also possible.

In the disclosed embodiment, the content provider 106 is a retailer that sells a plurality of products through an online website. In one example, the online website of the retailer can be organized to include a hierarchy of webpages. For example, the retailer's online website can include one or more product listings webpages and one or more product details webpages. In some examples, a product listing webpage can include a webpage that lists a plurality of products, often grouped together because of some similarity between the products, such as the products being the results of a search using a keyword, the products with the same category ID, etc. In some other examples, a product details webpage can include a webpage that lists a single product and detailed information and images associated with that product.

Figure 2:
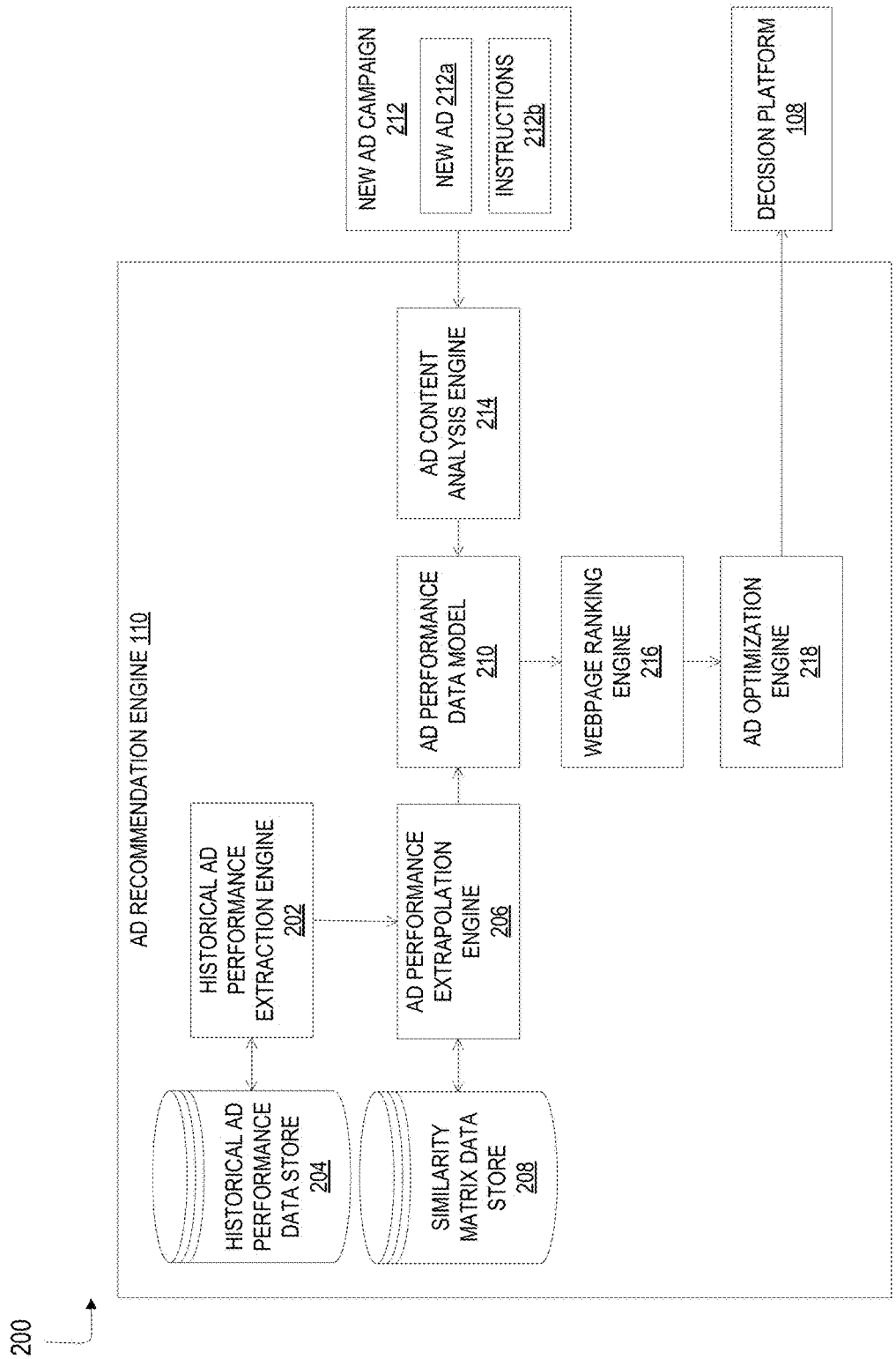
FIG. 2 illustrates an example embodiment of the ad recommendation engine.

FIG. 2 illustrates an example embodiment of the advertisement recommendation engine 110. In some examples, the advertisement recommendation engine 110 includes a historical ad performance extraction engine 202 that retrieves performance metrics associated with all previously published advertisements on the content provider website 106 from a historical advertisement performance data store 204. For example, the historical advertisement performance data store 204 includes performance data associated with every advertisement that was previously published on any of the webpages associated with the content provider's website 106. For example, the historical advertisement performance data store 204 may store, among other data, data associated with the advertisement, the webpage the advertisement was published on, the date and time period for which the advertisement was displayed on the webpage, performance metrics associated with the advertisement while displayed on the webpage, etc. In one example, the data associated with the advertisement may include information regarding the product or service associated with the advertisement. In another example, the data associated with the webpage that the advertisement was displayed on may include data related to the product or products displayed on the webpage. In another example, the performance metrics associated with the advertisement may include click though rate, number of impressions, number of conversions, view through conversions, etc. In some examples, the historical advertisement performance extraction engine 202 extracts the performance data of every advertisement previously published or displayed on one or more webpages of the content provider's website and make the extracted data available to the advertisement performance extrapolation engine 206.

In some examples, the advertisement performance extrapolation engine 206 extrapolates the performance data of an advertisement that was only displayed in a subset of webpages within the content provider's website 106 to extend to a larger subset of or all webpages within the content provider's website. Typically, not all advertisements are displayed on all webpages of a website. Therefore, for a particular advertisement, the performance data of an advertisement when displayed on a particular product page can be extrapolated to similar product pages. Extrapolating performance data to similar webpages provides more extensive performance indicators to refer to when place a novel advertisement in the future.

In some examples, the advertisement performance extrapolation engine 206 is connected to a similarity matrix data store 208. The similarity matrix data store 208 may include similarity matrix data. For example, a similarity matrix can include rows of every product available for sale from the content provider website 106 against columns of every other product available for sale from the content provider website 106. Each element of the similarity matrix includes a similarity score of how similar the product from that row is to the product from the column of the matrix. A similarity score may be a number that indicates how similar two items or products are. In some examples, the higher the score, the more the products are similar to each other. Other ways of scoring similarity are also possible. For example, if the similarity score ranges from 1 to 10, 1 indicating not similar at all and 10 indicating very similar, then two webpages, both displaying different brands of diapers would have a similarity score of 10. Whereas, a webpage for diapers and a webpage for playing cards may have a similarity score of 1.

In some examples, the advertisement performance extrapolation engine 206 uses the similarity matrix data and the historical advertisement performance data to extrapolate the performance of advertisements to similar webpages. For example, if the retailer website includes two webpages for diaper brand A and diaper brand B with a similarity score of 10, and ad performance data related to a diaper wipe product from brand C is available from when the advertisement was displayed on the diaper brand A's webpage, then it can be extrapolated and estimated that the performance of the advertisement for diaper wipe product from brand C may be the same or similar when displayed on the webpage for diaper brand B. The extracted and extrapolated performance data can be used to train an advertisement performance data model 210 to predict the performance of novel advertisements on particular webpages of the content provider website 106.

In some embodiments, the advertisement performance extrapolation engine 206 utilizes a data model implemented using a random forest model. In such an embodiment, the random forest model is trained using extracted and/or extrapolated advertisement performance data for each webpage of the retailer website, alongside the information determined from each of the ads that are associated with such performance data. Information determined from each of the advertisements may include, for example, a subject matter of the advertisement, such as product type, brand, image data, etc. As discussed below, the advertisement performance extrapolation engine 206 may determine characteristics of a new advertisement as well, and may, based on those characteristics and the trained model, output a list of the available webpages and expected performance of the new advertisement as to each of those webpages, such that an appropriate placement of the advertisement (also referred to as a "context") may be selected.

More specifically, in some examples, a new advertising campaign 212 is received by the advertisement recommendation engine 110 from an advertiser. Typically, advertising campaigns include the advertiser supplying an ad along with instructions on expected performance metrics to be met by the content provider displaying the advertisement on the content provider's website in exchange for a monetary sum. In on example, the new advertising campaign 212 may include a new ad 212a to be displayed on at least one webpage within the content provider's website 106 and instructions 212b on expected performance metrics to be delivered by the content provider for the ad. In some examples, the new ad 212a is an ad that has not been previously displayed on the plurality of webpages within the content provider's website 206. The instructions 212b on expected performance metrics is used by the ad optimization engine 218 in identifying the optimal webpage to display the new ad 212a and is described further in relation to the advertisement optimization engine 218 below.

In some examples, the advertisement recommendation engine 110 includes an advertisement content analysis engine 214 that receives the new advertising campaign 212. The advertisement content analysis engine 214 analyzes the received new ad 212a to identify the content and context of the ad. In one example, the advertisement content analysis engine 214 can use metadata associated with the new ad 212a, including alternate text associated with the new ad 212a to identify the content and context of the ad. In some examples, identifying the content and context of an ad includes identifying the product or service the ad is promoting, identifying the category of the product of service, identifying competitor products and service, identifying the demography of potential consumers of the product or service, etc.

In some examples, once the content and context of the new ad 212a is identified by the advertisement content analysis engine 214, the advertisement performance data model 210 is used in association with the identified content data regarding the new ad 212a to predict the performance of the new ad 212a on each of the plurality of webpages within the content provider website 106. In some cases, the advertisement performance data model 210 may provide a performance of the new ad 212a relative to all available webpages; in alternative examples, performance of the new ad 212a may be relative to a subset of all available webpages, e.g., those webpages over a particular performance threshold.

In some examples, a webpage ranking engine 216 can be used to rank and order the webpages according to the performance of the new ad 212a on each of the plurality of webpages within the content provider website 106 as predicted by the advertisement performance data model 210. For example, each potential webpage within the content provider website 106 can be ranked according to how well the ad is predicted to perform when displayed on the particular webpage by the advertisement performance data model 210. In some examples, the pages can then be ordered in descending order or from best ad performance to the worst ad performance. Other methods of ordering the webpages based on predicted ad performance are also possible. Here, performance can be measured in terms of click through rates, number of impressions, number of conversions or any other metric set by the advertiser or content provider.

In some examples, the advertisement optimization engine 218 is used to receive the webpage rankings as organized by the webpage ranking engine 216 and the instructions 212b on expected performance metrics to identify the webpage on the content provider's website 106 that would result in the optimal performance of the ad as identified in the instructions 212b. The process of ranking the webpages and identifying the webpage that would provide optimal performance is discussed in further detail in relation to FIG. 3 below. Upon identifying the webpage that would result in the optimal performance of the new ad 212a, the advertisement recommendation engine 110 can provide the identified webpage as the recommended webpage to publish or display the new ad 212a to the decision platform 108, which may then direct the content provider to display the new ad 212a on the recommended content provider webpage as recommended.

Figure 3:
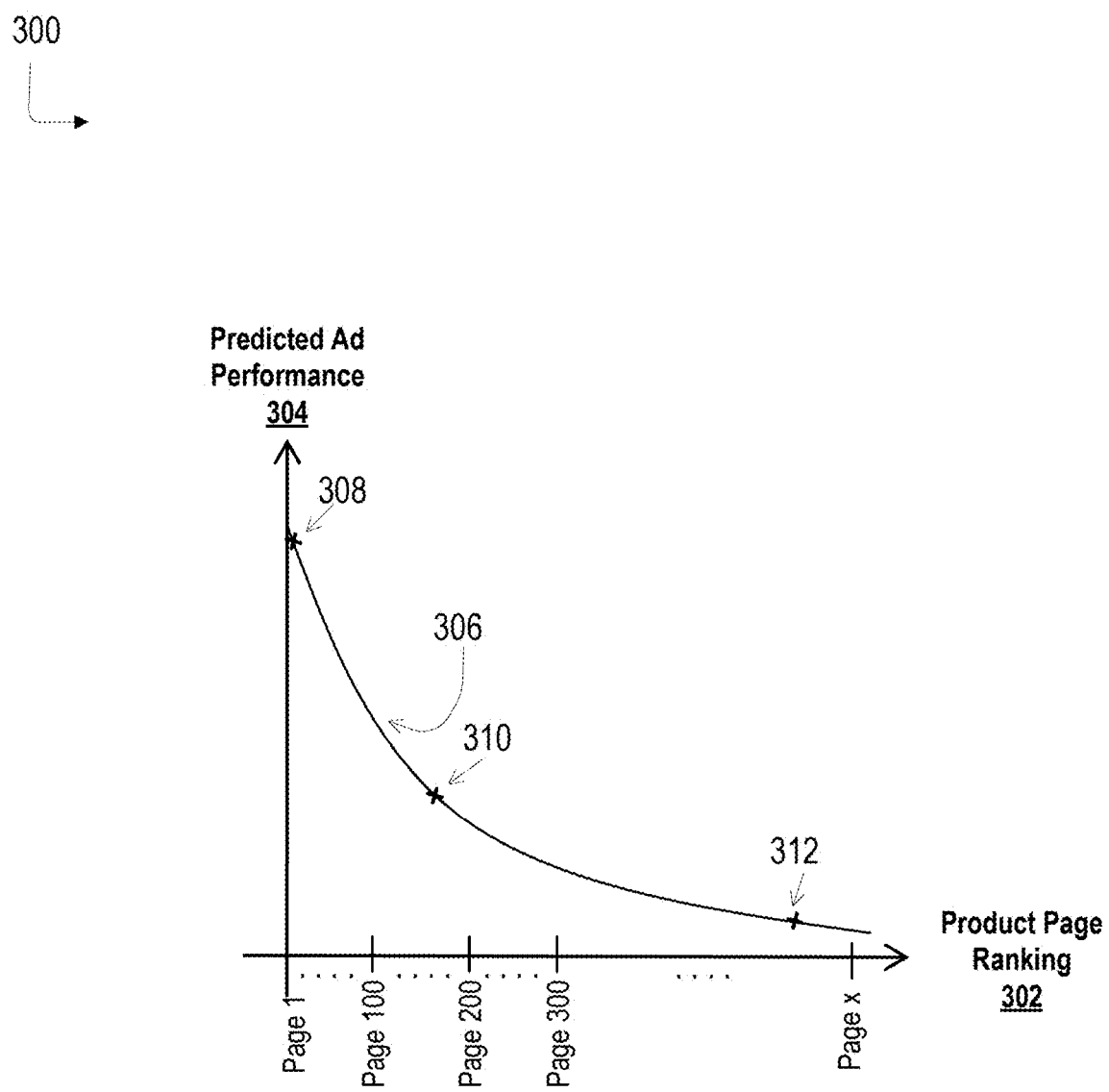
FIG. 3 illustrates an example graphical display of the ranking of content provider webpages based on ad performance.

FIG. 3 illustrates an example 300 graphical display of the ranking of content provider 106 webpages based on performance. In the disclosed example 300, the x-axis of the graph includes the product page rankings 310 and can include a list of the content provider's 106 webpages ordered from the webpage predicted to provide the best performance to the worst performance for the new ad 212a. In some examples, the list of the ranked content provider's 106 webpages may include a combination of both the product listing webpages and the product details webpages. In other examples, the list of ranked content provider's 106 webpages may only include product details webpages or may only include product listing webpages.

In the disclosed example 300, the y-axis of the graph includes the predicted performance 304 for each of the ranked content provider webpages. In some examples, the performance may be measured in terms of click through rates, number of impressions, number of conversions or any other metric set by the advertiser or content provider 106.

In the disclosed example 300, the relationship between each ranked page on the x-axis product page ranking 302 and the predicted performance 304 on the y-axis is plotted as a curve 306 to show that the content provider's 106 webpages that are ranked higher have performances that are predicted to be higher than the content provider's 106 webpages that are ranked lower. The curve 306 illustrated in the disclosed example 300 is only one example of the relationship between product page ranking 302 and predicted performance 304. Other relationships may also be possible.

Typically, advertisements are bought and sold in terms of performance metrics to be hit by the content provider in exchange for monetary sums. For example, a content provider 106 and an advertiser may enter into contract whereby the content provider agrees to display the advertiser's ad for a 2 week period and guarantee 2000 impressions of the ad during that 2 week period in exchange for the advertiser paying the content provider a certain fee. Other ways of structuring ad sales are also possible.

In case of the above structured deal of 2000 impressions over a 2 week period, selecting a webpage that has the best performance, as shown at point 308, on the curve 306 may result in the new ad 212a receiving 2000 impressions within the first day. On the other hand, selecting a webpage that has the worst performance, as shown at point 312, on the curve 306 may result in the new ad 212a receiving only 100 impressions during the two week period. The ad optimization engine 218 may analyze the predicted ad performance data in relation with the rankings of the content provider's 106 webpages in order to arrive at the webpage that results in the optimal performance, as shown at point 310, on the curve 306. In some examples, optimal performance may be determined to be the displayed ad consistently and steadily hitting the expected performance metrics over the contractual period. Other methods of determining optimal performance and what best serves the expectations of the advertiser are also possible. For example, in some ad campaigns, that may mean recommending the webpage that has the top ranking, bottom ranking or a ranking somewhere in the middle, depending on the expected performance metric for the new ad 212a. In the example case as described above, one possible determination of optimal performance may be the ad receiving approximately 143 impressions each day of the two week period. Other optimal performance determinations may also be possible.

In still further example embodiments, selecting a webpage that has a best performance may include selecting two or more different webpages having differing performance from each other relative to the new ad 212a. In such an example, an overall goal performance may be met by weighting performance on a per-page basis by a relative number of impressions that may be generated for that page.

Figure 4:
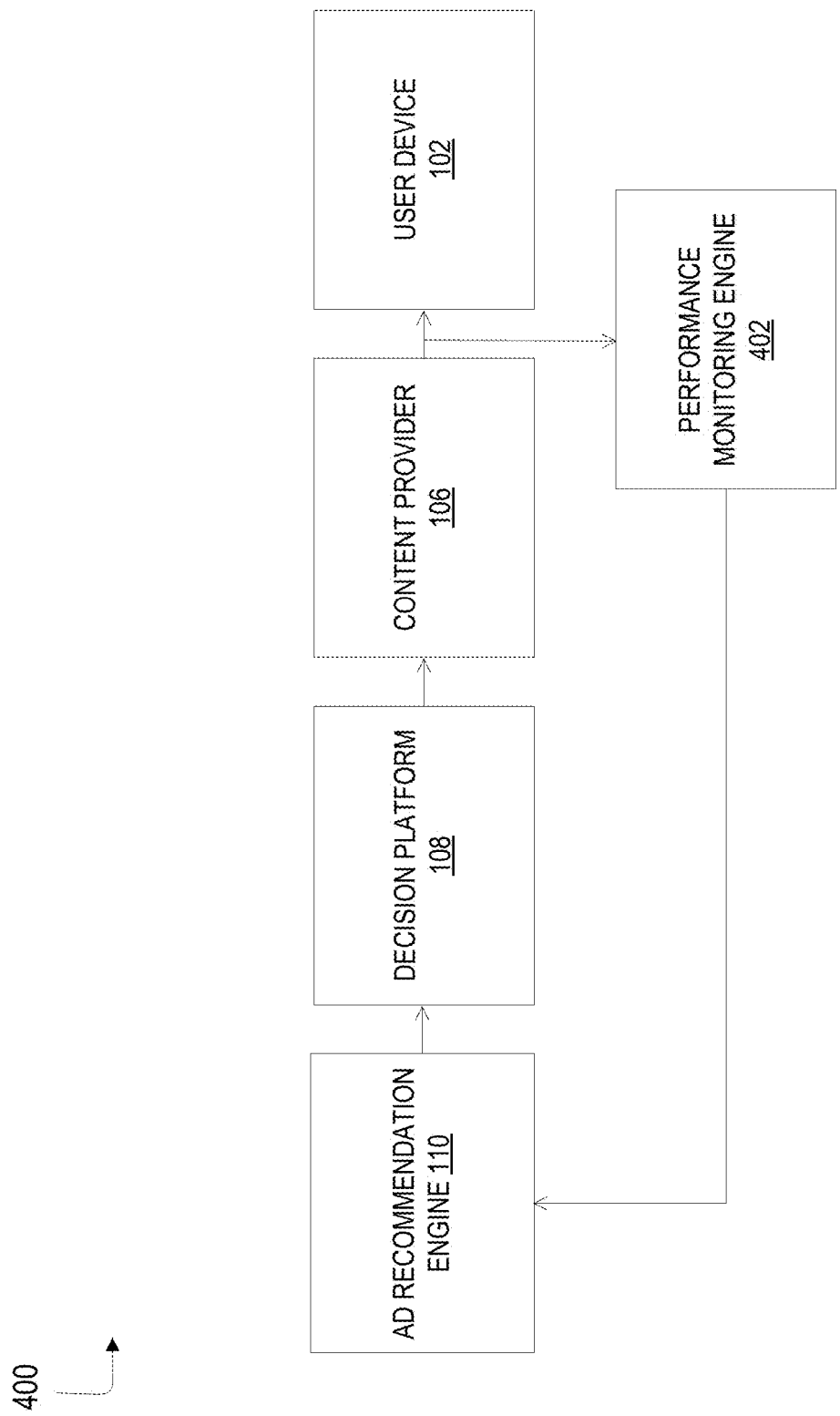
FIG. 4 illustrates another example directed information recommendation system.

FIG. 4 illustrates another example directed information recommendation system 400. As described in relation to FIGS. 1-2, in some examples, the ad recommendation engine 110 recommends one of a plurality of the content provider's 106 webpages on which to display a new ad 212a in order to meet the advertiser's expected performance for the new ad 212a. In other examples, the ad recommendation engine 110 provides the recommended content provider 106 webpage to the decision platform 108, which in turn determines whether to accept the advertisement recommendation engine's 110 recommendation. Upon determining to accept the advertisement recommendation engine's 110 recommendation to display the new ad 212a on a particular content provider 106 webpage, the decision platform provides the new ad 212a along with the identified recommended webpage to the content provider 106. In yet another example, the content provider 106 may display the new ad 212a on the recommended webpage and provided the webpage for public access. For example, a user using a user device 102 may be able to open the content provider webpage and view the new ad 212a displayed on the recommended webpage.

In some examples, a performance monitoring engine 402 is used to monitor the performance of the new ad 212a once it is placed and displayed on the recommended webpage. For example, the performance of the new ad 212a can, at regular time intervals, be compared to the performance metrics that were predicted by the advertisement performance data model 210. In some examples, the performance metrics may include click through rates. Other considerations associated with the performance metrics include the pace at which the ad is being viewed or interacted with by a customer. If the new ad 212a under-performs or over-performs when displayed on the recommended webpage, then the performance monitoring engine 402 can use the advertisement performance data model 210 and the data from the webpage ranking engine 216 and advertising optimization engine 218 from the advertisement recommendation engine 110 to re-optimize the webpage recommendation and place the new ad 212a on a new recommended webpage that more closely delivers the ad performance expected by the advertiser.

Additionally, the performance of the new ad 212a, and characteristics of that new ad, may be used in conjunction with existing ad performance data (and any other performance data for other new ads) to retrain the data model used by the ad recommendation engine 110.

In another example, if the new ad generates views or clicks faster than anticipated and the obligations under contract with the advertiser is being exhausted too quickly, then instead of placing the new ad 212a on a new recommended webpage, the placement of the new ad 212 on the recommended webpage may be controlled such that the ad is not displayed on the recommended webpage for the same amount of time or at the same interval as originally recommended. In other words, if the contractual obligations with the advertiser calls for 1000 views over a 10 day period, and the new ad 212 placed according to the recommendations of the disclosed system has generated 500 views within the first day, then the placement of the new ad 212a may be controlled such that new ad 212a is only placed on the recommended webpage for an hour a day rather than 10 hours a day as originally recommended.

FIG. 5 illustrates an example flow diagram 500 of the method for recommending an optimal placement for an ad. In example step 502, the method includes receiving an ad for display from an advertiser. The ad may be a video ad, audio ad, text ad or image ad or a combination thereof. The advertiser may send the ad and the content provider's 106 server may receive the ad to be displayed on at least one of the plurality of the content provider's 106 webpages.

In example step 504, the method includes receiving instructions from the advertiser on the expected performance of the ad over a period of time. For example, the advertiser may stipulate that they expect the ad to garner a predetermined number of impressions over a predetermined period (e.g., 2000 impressions over a two week time span). Other performance metrics and expectations for the ad's performance may also be presented by the advertiser. In some examples, the instructions on expected ad performance are sent to the content provider and the content provider's goal is to meet the expectation of the advertiser by placing the ad in an optimal location that can garner the expected performance for the ad. The content provider is then left with the challenge of identifying the webpage among the content provider's plurality of webpages that can result in the optimal performance for the ad.

In example step 506, the method includes extracting data associated with the ad from the advertiser. The extracted data may include data associated with the context and content of the ad. In some examples, data associated with the ad can be extracted by analyzing the metadata associated with the ad file and analyzing the text, image, alternate text associated with the ad. Other methods of extracting data including content and context data from the ad is also possible.

In example step 508, the method includes retrieving historical ad performance data. In some examples, all data associated with any ad that was previously displayed on any of the plurality of webpages included within the content provider's 106 website are retrieved. For example, every time an ad is displayed on any of the content provider's webpages, data associated with the ad's performance on the content provider's 106 webpage is extracted and stored in a data store, which may include a database. The extracted data may include the content and context of the ad, the content and context of the webpage on which the ad was displayed, the time period during which the ad was displayed, the actual performance of the ad over the time period, etc. Other data associated with the ad's performance and content are also extracted and stored in a data store. The extracted data regarding the ads is retrieved by the ad recommendation engine 110 for use in step 510 described below.

In addition to the historical ad performance data, in some examples, data regarding the similarity between the content provider's plurality of webpages is extracted and mapped as a similarity matrix for use in step 510 described below. For example, the content provider 106 analyzes each of the plurality of webpages within its website and determines a similarity score between each of the plurality of webpages. In one example, if the content provider 106 includes ten webpages, with each webpage describing a product that the retailer (who is also the content provider) is selling online, then each of the ten webpages is compared to the nine other webpages within the content provider's website and a similarity score is determined for how similar a webpage is to the nine other webpages. The similarity scores can then be mapped into a similarity matrix. In the above example, a 10×10 matrix with the rows indicating each of the ten webpages and the columns also indicating each of the ten webpages can be used. Each element within the 10×10 matrix includes a similarity score between the row and column webpages associated with that element. In reality, an online retailer may sell thousands of products and a similarity matrix may include a matrix with thousands of rows by thousands of columns. The similarity matrix may provide data on how similar the webpages are that may help with the extrapolation of the historical ad performance data as described in step 510 below.

In example step 510, the method includes predicting the performance of the ad when displayed on each of the plurality of the content provider's 106 webpages. A combination of the retrieved historical ad performance data from step 508 and the retrieved similarity matrix data from step 508 are used in training a data model into predicting the performance of a new or novel ad when displayed on any one of the content provider's webpages. A new or novel ad is an ad that has never been displayed on any of the content provider's 106 webpages. The data model may include a random forest model, but can also be a different type of data model. Once the data model is trained to predict performances of an ad, the extracted content and context data associated with the ad from step 506 can fed into the data model in order for the data model to predict the performance of the ad from advertiser when displayed on each one of the content provider's 106 plurality of webpages.

In example step 512, the method includes organizing the plurality of the content provider's 106 webpages into an order based on the predicted performance of the ad when displayed on each of the webpages as described in step 510. For example, upon determining how the ad would perform if displayed on each of the plurality of the content provider's 106 webpages, the webpages are ordered based on the predicted performances. The order of the webpages may be in ascending or descending order of performance or may be ordered in other ways. Ascending order of performance may include ordering the content provider's 106 plurality of webpages from the webpage predicted to deliver the least performance for the ad to the webpage predicted to deliver the best performance for the ad. Descending order of performance may include ordering the content provider's 106 plurality of webpages from the webpage predicted to deliver the best performance for the ad to the webpage predicted to deliver the worst performance for the ad.

In example step 514, the method includes identifying a subset of content provider webpages from the order plurality of webpages that will meet the advertiser's expected performance of the ad. In one example, the method includes analyzing the instructions received from the advertiser on expected ad performance to determine which of the webpages among the ordered webpages from step 512 are optimal in meeting the advertiser's expected ad performance. In one example, the goal can be to not to exceed or fall below the performance expectations of the advertiser. For example, the expectations for ad performance can typically be identified in terms of impressions or click through rate (or another performance metric) within a given period of time. Optimally, the performance of the ad is consistent over the period of time that is displayed on a webpage. In other words, most advertisers may prefer that the ad has a constant rate of impressions, or click through rates, etc. over the display period rather than generate a large number of impressions, click through rates, etc. in a short period of time while remaining idle with no user interaction for the rest of the display period. Therefore, identifying the webpages that would provide a consistent rate of performance in order to meet the advertiser's expected ad performance over the display period can be considered optimal by most advertisers. In step 514, the method identifies a subset of webpages that are predicted to provide the consistent rate of performance while still meeting the ad performance metric expected by the advertiser over the display period. Other ways of defining optimal performance are also possible based on advertiser preferences.

In example step 516, the method includes recommending one or more of the identified webpages from step 514 to a decision platform 108 as being the optimal webpage(s) that would provide the advertiser's expected ad performance. In addition, the method may also include recommending the length of time the advertisement is displayed on the webpage and the time of day when the advertisement is displayed on the webpage In some examples, the decision platform 108 may then evaluate the recommendation along with other potential recommendations from other ad recommendation engines running other algorithms based on other advertiser criteria and make the decision to provide the recommended webpage(s) from the disclosed ad recommendation engine 110 to the content provider 106 for display of the ad.

Figure 6:
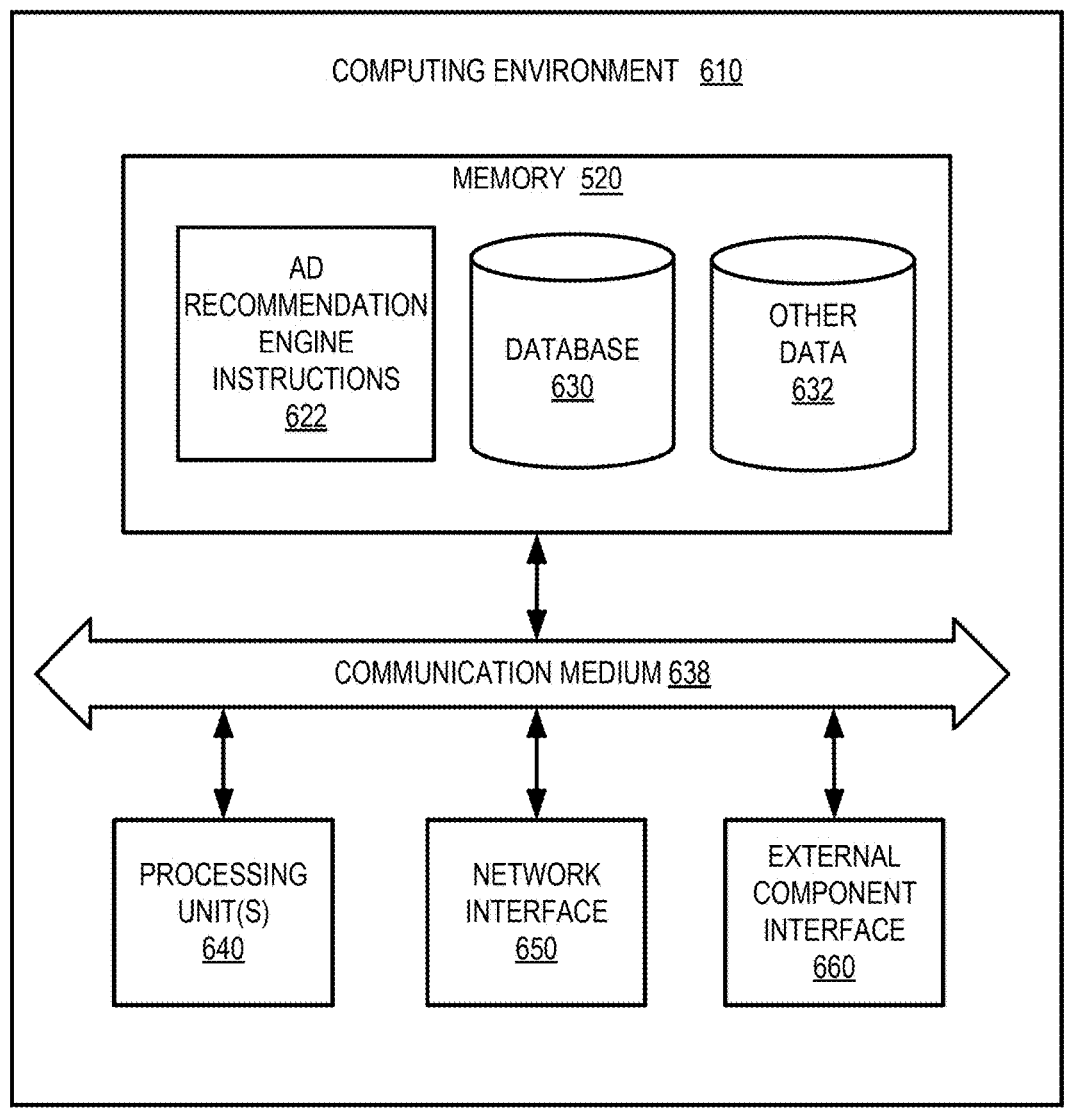
FIG. 6 illustrates an example system with which disclosed systems and methods can be used.

FIG. 6 illustrates an example system 600 with which disclosed systems and methods can be used. In an example, the user device 102, content provider 106, delivery platform 108 and directed information recommendation engine 110 can be implemented as one or more systems 600 or one or more systems having one or more components of systems 600. In an example, the system 600 can include a computing environment 610. The computing environment 610 can be a physical computing environment, a virtualized computing environment, or a combination thereof. The computing environment 610 can include memory 620, a communication medium 638, one or more processing units 640, a network interface 650, and an external component interface 660.

The memory 620 can include a computer readable storage medium. The computer storage medium can be a device or article of manufacture that stores data and/or computer-executable instructions. The memory 620 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 620 can store various types of data and software. For example, as illustrated, the memory 620 includes directed information recommendation engine instructions 622 for implementing one or more aspects of the directed information recommendation engine 110 described herein (e.g., as described in relation to FIGS. 1-5), database 630 (e.g., as described in relation to databases 204, 208 of FIG. 2), as well as other data 632. In some examples (e.g., where the computing environment 610 is a user device 102), the memory 620 can include instructions for obtaining content from a content provider and providing the content to a user. In some examples (e.g., where the computing environment 610 is a directed information recommendation engine 110), the memory 620 can include instructions for acting as a directed information recommendation engine.

The communication medium 638 can facilitate communication among the components of the computing environment 610. In an example, the communication medium 638 can facilitate communication among the memory 620, the one or more processing units 640, the network interface 650, and the external component interface 660. The communications medium 638 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 640 can include physical or virtual units that selectively execute software instructions. In an example, the one or more processing units 640 can be physical products comprising one or more integrated circuits. The one or more processing units 640 can be implemented as one or more processing cores. In another example, one or more processing units 640 are implemented as one or more separate microprocessors. In yet another example embodiment, the one or more processing units 640 can include an application-specific integrated circuit (ASIC) that provides specific functionality. In yet another example, the one or more processing units 640 provide specific functionality by using an ASIC and by executing computer-executable instructions.

The network interface 650 enables the computing environment 610 to send and receive data from a communication network (e.g., network 104). The network interface 650 can be implemented as an Ethernet interface, a token-ring network interface, a fiber optic network interface, a wireless network interface (e.g., WI-FI), or another type of network interface.

The external component interface 660 enables the computing environment 610 to communicate with external devices. For example, the external component interface 660 can be a USB interface, Thunderbolt interface, a Lightning interface, a serial port interface, a parallel port interface, a PS/2 interface, and/or another type of interface that enables the computing environment 610 to communicate with external devices. In various embodiments, the external component interface 660 enables the computing environment 610 to communicate with various external components, such as external storage devices, input devices, speakers, modems, media player docks, other computing devices, scanners, digital cameras, and fingerprint readers.

Although illustrated as being components of a single computing environment 610, the components of the computing environment 610 can be spread across multiple computing environments 610. For example, one or more of instructions or data stored on the memory 620 may be stored partially or entirely in a separate computing environment 610 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A computer implemented method to optimize performance of an advertisement, comprising:
   receiving the advertisement for display on at least one of a plurality of webpages from an advertiser;
   receiving instructions from the advertiser on expected performance associated with the advertisement over a contractual period, wherein the expected performance relates to an impression rate, a click through rate or a conversion rate;
   extracting context data associated with the advertisement;
   retrieving historical performance data associated with previous displays of a plurality of previous advertisements across the plurality of webpages;
   retrieving similarity data between the plurality of webpages;
   using the extracted context data associated with the advertisement, retrieved historical performance data and the similarity data, predicting the performance of the advertisement when displayed on each of the plurality of webpages;
   organizing the plurality of webpages in an order based on the predicted performance of the advertisement on each of the plurality of webpages;

using the organized plurality of webpages, identifying a webpage among the plurality of webpages that meets the expected performance consistently over the contractual period based on the predicted performance of the advertisement, wherein the expected performance corresponds to a constant rate over the contractual period, and wherein identifying the webpage among the plurality of webpages such that the impression rate, click through rate or conversion rate is consistent with the constant rate over the contractual period;

recommending that the advertisement be displayed on the webpage based on a set of specifications;

monitoring whether an actual performance of the advertisement, when displayed on the webpage, matches the predicted performance; and upon determining that the actual performance, including the advertisement generating impression rates, click through rates or conversion rates, has a faster rate than the predicted performance when displayed on the webpage, ceasing recommending that the advertisement be displayed on the webpage and recommending that the advertisement be displayed on a new webpage of the plurality of webpages, wherein the predicted performance of the advertisement on the new webpage is below the predicted performance of the advertisement on the webpage.

2. The computer implemented method of claim 1, wherein the set of specifications include: length of time the advertisement is displayed on the webpage and the time of day when the advertisement is displayed on the webpage.

3. The computer implemented method of claim 1, further comprising:

extrapolating the performance data associated with previous displays of one or more prior advertisements on one or more of the plurality of webpages to the rest of the plurality of webpages.

4. The computer implemented method of claim 1, wherein the performance of the advertisement is measured using at least one of: click though rate, number of impressions, number of conversions, and view through conversions.

5. The computer implemented method of claim 1, wherein the extracted context data associated with the advertisement and retrieved performance data are used to train a data model to predict the performance of the advertisement when displayed on each of the plurality of webpages.

6. The computer implemented method of claim 1, wherein the plurality of webpages are ordered in one of: ascending order of predicted performance and descending order of predicted performance;

wherein the ascending order of predicted performance includes the plurality of webpages ordered from the webpage predicted to result in highest performance for the advertisement to the webpage predicted to result in the lowest performance for the advertisement; and wherein the descending order of predicted performance includes the plurality of webpages ordered from the webpage predicted to result in the lowest performance for the advertisement to the webpage predicted to result in the highest performance for the advertisement.

7. A system to optimize performance of an advertisement, comprising:

a processor;

a non-transitory computer-readable medium storing data instructions which, when executed by the processor, cause the processor to:

receive the advertisement for display on at least one of a plurality of webpages from an advertiser;

receive instructions, from the advertiser, on expected performance associated with the advertisement over a contractual period, wherein the expected performance relates to an impression rate, click through rate or conversion rate;

extract context data associated with the advertisement;

retrieve historical performance data associated with previous displays of a plurality of previous advertisements across the plurality of webpages;

retrieve similarity data between the plurality of webpages;

using the extracted context data associated with the advertisement, retrieved performance data and the similarity data, predict the performance of the advertisement when displayed on each of the plurality of webpages;

organize the plurality of webpages in an order based on the predicted performance of the advertisement when displayed on each of the plurality of webpages;

using the organized plurality of webpages, identify a webpage among the plurality of webpages that meets the expected performance consistently over the contractual period based on the predicted performance of the advertisement, wherein the expected performance corresponds to a constant rate over the contractual period, and wherein identifying the webpage among the plurality of webpages such that the impression rate, click through rate or conversion rate is consistent with the constant rate over the contractual period;

recommend that the advertisement be displayed on the webpage based on a set of specifications;

monitor whether an actual performance of the advertisement, when displayed on the webpage, matches the predicted performance; and upon determining that the actual performance, including the advertisement generating impression rates, click through rates or conversion rates, has a faster rate than the predicted performance when displayed on the webpage, cease recommending that the advertisement be displayed on the webpage and recommending that the advertisement be displayed on a new webpage of the plurality of webpages, wherein the predicted performance of the advertisement on the new webpage is below the predicted performance of the advertisement on the webpage.

8. The system from claim 7, wherein the set of specifications include: length of time the advertisement is displayed on the webpage and the time of day when the advertisement is displayed on the webpage.

9. The system from claim 7, further comprising:

extrapolate the performance data associated with previous displays of one or more prior advertisements on one or more of the plurality of webpages to the rest of the plurality of webpages.

10. The system from claim 7, wherein the performance of the advertisement is measured using at least one of: click though rate, number of impressions, number of conversions, and view through conversions.

11. The system from claim 7, wherein the extracted context data associated with the advertisement and retrieved performance data are used to train a data model to predict the performance of the advertisement when displayed on each of the plurality of webpages.

12. The system from claim 7, wherein the plurality of webpages are ordered in one of: ascending order of predicted performance and descending order of predicted performance;

wherein the ascending order of predicted performance includes the plurality of webpages ordered from the webpage predicted to result in highest performance for the advertisement to the webpage predicted to result in the lowest performance for the advertisement; and wherein the descending order of predicted performance includes the plurality of webpages ordered from the webpage predicted to result in the lowest performance for the advertisement to the webpage predicted to result in the highest performance for the advertisement.

13. An advertisement recommendation server comprising:

a processor;

a non-transitory computer-readable medium storing data instructions which, when executed by the processor, cause the processor to:
- receive an advertisement request including an advertisement from an advertiser for display on at least one of a plurality of webpages and a requested performance of the advertisement over a contractual period, wherein the requested performance relates to an impression rate, a click through rate or a conversion rate;
- extract context data from the advertisement;
- provide the extracted context data to a random forest data model useable to generate predictions of performance of the advertisement when displayed on each of a plurality of webpages, the random forest data model being trained based on historical performance data associated with previous displays of a plurality of previous advertisements across the plurality of webpages, and similarity data between the plurality of webpages and context data from the plurality of previous advertisements; and
- identify a webpage among the plurality of webpages that meets the expected performance consistently over the contractual period based on the generated predictions of performance of the advertisement, wherein the expected performance corresponds to a constant rate over the contractual period, and wherein identifying the webpage among the plurality of webpages such that the impression rate, click through rate or conversion rate is consistent with the constant rate over the contractual period;
- transmit a recommendation that the advertisement be displayed on the webpage to a decision platform;
- monitor whether an actual performance of the advertisement when displayed on the webpage matches the predicted performance; and
- upon determining that the actual performance, including the advertisement generating impression rates, click through rates or conversion rates, has a faster rate than the predicted performance when displayed on the webpage, cease recommending that the advertisement be displayed on the webpage and recommending that the advertisement be displayed on a new webpage of the plurality of webpages, wherein the predicted performance of the advertisement on the new webpage is below the predicted performance of the advertisement on the webpage.

14. The advertisement recommendation server of claim 13, wherein, based on the recommendation, the decision platform provides an identification of the advertisement for display with the webpage in response to a request from a user device for the webpage.

15. The advertisement recommendation server of claim 13, wherein the instructions further cause the processor to organize the predictions of performance of the advertisement in an order based on the predicted performance of the advertisement when displayed on each of the plurality of webpages.

16. The advertisement recommendation server of claim 13, wherein the recommendation identifies two or more webpages.

* * * * *